US012385295B2

(12) United States Patent
Tatemichi et al.

(10) Patent No.: US 12,385,295 B2
(45) Date of Patent: Aug. 12, 2025

(54) HANDLE DEVICE FOR VEHICLE

(71) Applicant: ALPHA CORPORATION, Kanagawa (JP)

(72) Inventors: Saeko Tatemichi, Yokohama (JP); Ryoichi Tanaka, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 108 days.

(21) Appl. No.: 18/526,694

(22) Filed: Dec. 1, 2023

(65) Prior Publication Data

US 2024/0093536 A1 Mar. 21, 2024

Related U.S. Application Data

(63) Continuation of application No. PCT/JP2022/022565, filed on Jun. 2, 2022.

(30) Foreign Application Priority Data

Jun. 4, 2021 (JP) ................................ 2021-094114

(51) Int. Cl.
*E05B 79/06* (2014.01)

(52) U.S. Cl.
CPC .................................. *E05B 79/06* (2013.01)

(58) Field of Classification Search
CPC ......... E05B 79/06; E05B 85/16; Y10T 292/57
See application file for complete search history.

(56) References Cited

U.S. PATENT DOCUMENTS 5,685,581 A * 11/1997 Kritzler .................... E05B 85/16 292/336.3
6,363,577 B1 * 4/2002 Spitzley .................. E05B 79/06 292/336.3

(Continued)

FOREIGN PATENT DOCUMENTS

CN 101200181 A * 6/2008 ............. E05B 77/06
CN 209670597 U 11/2019

(Continued)

OTHER PUBLICATIONS

Written Opinion of the International Searching Authority issued in PCT/JP2022/022565; mailed Aug. 16, 2022.

(Continued)

*Primary Examiner* — Kristina R Fulton
*Assistant Examiner* — Steven A Tullia
(74) *Attorney, Agent, or Firm* — Studebaker Brackett PLLC

(57) ABSTRACT

A door handle device for a vehicle includes a handle base fixed to a door of a vehicle, and an operation handle rotatably coupled to the handle base. The operation handle includes a coupling protruding portion that is provided at an end portion on a rotation center side of the operation handle. The handle base includes an elastically deformable elastic piece that is adjacent to the coupling protruding portion. Movement of the operation handle toward a rotation tip end is restricted by elastically engaging a stopper protruding portion formed on any one of the coupling protruding portion and the elastic piece with a stopper fitting portion formed on the other by using elastic deformation of the elastic piece. Movement of the elastic piece in a disengagement direction of the stopper protruding portion is restricted by a clip mounted on the handle base.

6 Claims, 13 Drawing Sheets

(56) References Cited

U.S. PATENT DOCUMENTS

| | | | | | |
|---|---|---|---|---|---|
| 6,964,439 | B2 * | 11/2005 | Nomura | E05B 77/36 292/346 |
| 7,011,349 | B2 * | 3/2006 | Nomura | E05B 85/16 292/DIG. 64 |
| 7,344,168 | B2 * | 3/2008 | Matsubara | E05B 79/06 292/336.3 |
| 7,527,307 | B2 * | 5/2009 | Belchine, III | E05B 77/42 292/DIG. 31 |
| 7,575,269 | B2 * | 8/2009 | Kobayashi | H01R 13/5812 296/146.1 |
| 8,459,706 | B2 * | 6/2013 | Yoshino | E05B 85/16 292/336.3 |
| 8,991,880 | B2 * | 3/2015 | Yokoyama | E05B 85/10 292/336.3 |
| 9,797,172 | B2 * | 10/2017 | Kammerbauer | E05B 85/16 |
| 10,267,072 | B2 * | 4/2019 | Yoshino | E05B 79/06 |
| 10,907,388 | B2 * | 2/2021 | Miller | E05B 85/16 |
| 11,255,113 | B2 * | 2/2022 | Saitou | E05B 77/36 |
| 11,788,324 | B2 * | 10/2023 | Ooyama | E05B 85/16 292/336.3 |
| 2004/0217602 | A1 * | 11/2004 | Nomura | E05B 85/16 292/336.3 |
| 2008/0047203 | A1 * | 2/2008 | Sunahara | E05B 85/16 49/460 |
| 2011/0042973 | A1 | 2/2011 | Yoshino et al. | |
| 2016/0032627 | A1 | 2/2016 | Yoshino et al. | |
| 2017/0298660 | A1 | 10/2017 | Nagata et al. | |
| 2018/0298650 | A1 | 10/2018 | Ichikawa | |

FOREIGN PATENT DOCUMENTS

| | | | | | |
|---|---|---|---|---|---|
| CN | 111919008 | A | * | 11/2020 | E05B 79/06 |
| DE | 4029694 | A1 | * | 4/1991 | E05B 79/06 |
| DE | 19720253 | A1 | * | 11/1998 | E05B 79/06 |
| DE | 19537984 | C2 | * | 2/2001 | E05B 85/16 |
| DE | 102017114548 | A1 | * | 1/2018 | B60J 5/0416 |
| DE | 102019111548 | A1 | * | 12/2019 | E05B 79/06 |
| EP | 1797960 | A1 | * | 6/2007 | E05B 85/16 |
| EP | 1839958 | A1 | * | 10/2007 | E05B 79/06 |
| EP | 3396090 | A1 | * | 10/2018 | E05B 79/06 |
| JP | 2006-063575 | A | | 3/2006 | |
| JP | 4015568 | B2 | * | 11/2007 | E05B 79/06 |
| JP | 4406804 | B2 | * | 2/2010 | E05B 1/00 |
| JP | 4469241 | B2 | * | 5/2010 | E05B 85/16 |
| JP | 2011-038371 | A | | 2/2011 | |
| JP | 4738650 | B2 | * | 8/2011 | E05B 1/00 |
| JP | 5153742 | B2 | * | 2/2013 | E05B 79/06 |
| JP | 5235815 | B2 | * | 7/2013 | E05B 1/00 |
| JP | 5407652 | B2 | * | 2/2014 | E05B 79/06 |
| JP | 2016-030983 | A | | 3/2016 | |
| JP | 2016-069945 | A | | 5/2016 | |
| JP | 5950382 | B2 | * | 7/2016 | E05B 79/06 |
| JP | 2017115352 | A | * | 6/2017 | E05B 79/06 |
| JP | 2018071265 | A | * | 5/2018 | E05B 85/16 |
| JP | 6399291 | B2 | * | 10/2018 | E05B 79/06 |
| KR | 20040032167 | A | * | 4/2004 | B60J 5/04 |
| WO | WO-2006029707 | A1 | * | 3/2006 | E05B 79/06 |

OTHER PUBLICATIONS

International Search Report issued in PCT/JP2022/022565; mailed Aug. 16, 2022.

* cited by examiner

HANDLE DEVICE FOR VEHICLE

CROSS-REFERENCE TO RELATED APPLICATIONS

The present application is a continuation application of PCT/JP2022/022565 that claims priority to Japanese Patent Application No. 2021-094114 filed on Jun. 4, 2021, the entire content of which is incorporated herein by reference.

TECHNICAL FIELD

The present disclosure relates to a door handle device for a vehicle.

BACKGROUND ART

As a handle device for a vehicle in which an operation handle is coupled to a handle base fixed to a door in advance with a sliding operation, a handle device described in JP2006-063575A is known.

In this related-art example, the operation handle includes a support arm at a tip end portion thereof, and bearing holes are formed in the support arm. Inclined groove portions are each formed in a region from a tip end of the support arm to the bearing hole such that a peripheral edge of the bearing hole is at the highest position.

On the other hand, the handle base is provided with a columnar shaft portion protruding from a tip ends of thin plate-shaped bending portions, and the shaft portion is guided to the groove portion of the handle base when the operation handle is slid. Thereafter, when the operation handle is further moved forward, since a tip end of the shaft portion rides on the inclination of the groove portions, the bending portions bend and pass over the groove portions, and when the shaft portion matches the bearing holes, the shaft portion falls into the bearing holes due to an elastic restoring force of the bending portions, and the operation handle is rotatably coupled to the handle base.

SUMMARY OF INVENTION

Technical Problem

However, in the above-described related-art example, when a force for pulling out the operation handle rearward is applied, a rearward force is applied to the shaft portion fixed to free ends of the bending portions on a front end surface of the shaft portion and at a position closer to the operation handle from coupling portions of the bending portions.

The bending portion having the thin plate shape receives a force in a twisting direction by the force applied to the shaft portion, and there is a concern that the engagement with the bearing holes is released. In particular, when a pull-out force is applied in a state where the force in the twisting direction is applied, the bending force applied to the bending portions also increases, and there is a problem that detachment of the operation handle easily occurs.

The present disclosure has been made to solve such a problem, and relates to a handle device for a vehicle in which detachment of an operation handle from a handle base is less likely to occur.

Solution to Problem

A door handle device for a vehicle according to the present disclosure is as follows.

The door handle device for a vehicle includes: a handle base 1 fixed to a door of a vehicle; and an operation handle 2 rotatably coupled to the handle base 1, in which movement of the operation handle 2 toward a rotation tip end is restricted by elastically engaging a stopper protruding portion 5 formed on any one of a coupling protruding portion 3 that is provided at an end portion on a rotation center (C2) side of the operation handle 2 and elastically deformable elastic pieces 4 that are adjacent to the coupling protruding portion 3 in the handle base 1 with a stopper fitting portion 6 formed on the other by using elastic deformation of the elastic pieces 4, and movement of the elastic pieces 4 in a disengagement direction of the stopper protruding portion 5 is restricted by a clip 7 mounted on the handle base 1.

Advantageous Effects of Invention

According to the present disclosure, since the elastic deformation of the elastic piece is further restricted by the clip, the stopper protruding portion is not inadvertently detached from the stopper fitting portion.

BRIEF DESCRIPTION OF DRAWINGS

FIGS. 2A and 2B show views of the handle device for a vehicle of the present disclosure, in which FIG. 2A is a view taken in the direction of an arrow 2A in FIG. 1, and FIG. 2B is a partially enlarged view of FIG. 2A when viewed in the direction of an arrow 2B;

FIGS. 4A to 4C show views of an operation handle, in which FIG. 4A is a plan view, FIG. 4B is a cross-sectional view taken along a line 4B-4B in FIG. 4A, and FIG. 4C is a view taken in the direction of an arrow 4C in FIG. 4A;

FIGS. 5A to 5C show plan view of a handle base, in which FIG. 5A is a plan view showing a front end portion of the handle base, FIG. 5B is a view taken in the direction of an arrow 5B in FIG. 5A, and FIG. 5C is a view taken in the direction of an arrow 5C in FIG. 5A;

FIGS. 6A to 6C show cross-sectional views taken along a line 6A-6A in FIG. 5A showing a process of mounting the operation handle, in which FIG. 6A is a view showing a state where a coupling protruding portion is inserted into the handle base, FIG. 6B is a view showing a state where the operation handle is slid forward, and FIG. 6C is a view showing a state where the mounting is completed;

FIGS. 7A to 7C show views of a clip, in which FIG. 7A is a plan view, FIG. 7B is a view taken in the direction of an arrow 7B in FIG. 7A, and FIG. 7C is a cross-sectional view taken along a line 7C-7C in FIG. 7A;

FIGS. 8A and 8B show views of a state where the clip is held at a restraint position, in which FIG. 8A is a cross-sectional view taken along a line 8A-8A in FIG. 2B, and FIG. 8B is a partially enlarged view of a detent stop portion;

FIGS. 9A and 9B show views of a state where the clip is held at a restraint release position, in which FIG. 9A is a view corresponding to FIG. 8A, and FIG. 9B is a partially enlarged view of the detent stop portion;

FIGS. 11A to 11C show cross-sectional views of FIG. 8A, in which FIG. 11A is a cross-sectional view taken along a line 11A-11A in FIG. 8A, FIG. 11B is a cross-sectional view taken along a line 11B-11B in FIG. 11A, and FIG. 11C is a cross-sectional view taken along a line 11C-11C in FIG. 11A;

FIGS. 12A and 12B show views of another embodiment of the present disclosure, in which FIG. 12A is a diagram corresponding to FIG. 8A, and FIG. 12B is a view taken in the direction of an arrow 12B in FIG. 12A;

FIGS. 13A to 13C show views of a clip, in which FIG. 13A is a plan view, FIG. 13B is a view taken in the direction of an arrow 13B in FIG. 13A, and FIG. 13C is a cross-sectional view taken along a line 13C-13C in FIG. 13A;

FIGS. 15A to 15C show cross-sectional views of FIG. 12A, in which FIG. 15A is a cross-sectional view taken along a line 15A-15A in FIG. 12A, FIG. 15B is a cross-sectional view taken along a line 15B-15B in FIG. 15A, and FIG. 15C is a view corresponding to FIG. 15B in a state where the clip is at a restraint release position; and FIGS. 16A to 16C show views of the clip at a restraint release position, in which FIG. 16A is a view corresponding to FIG. 12A, FIG. 16B is a cross-sectional view taken along a line 16B-16B in FIG. 15A, and FIG. 16C is an enlarged perspective view of a main part viewed from the back surface direction.

DESCRIPTION OF EMBODIMENTS

Figure 1:
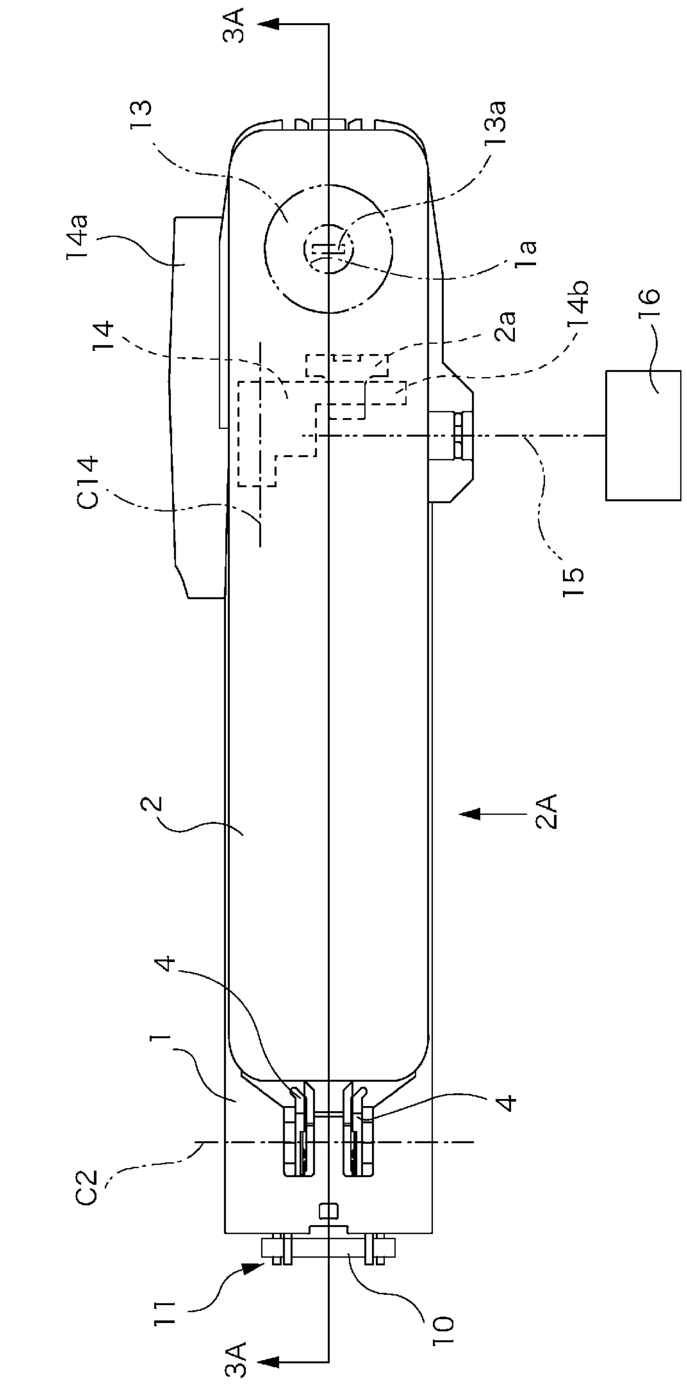
FIG. 1 is a front view showing a handle device for a vehicle of the present disclosure.
Figure 2A:
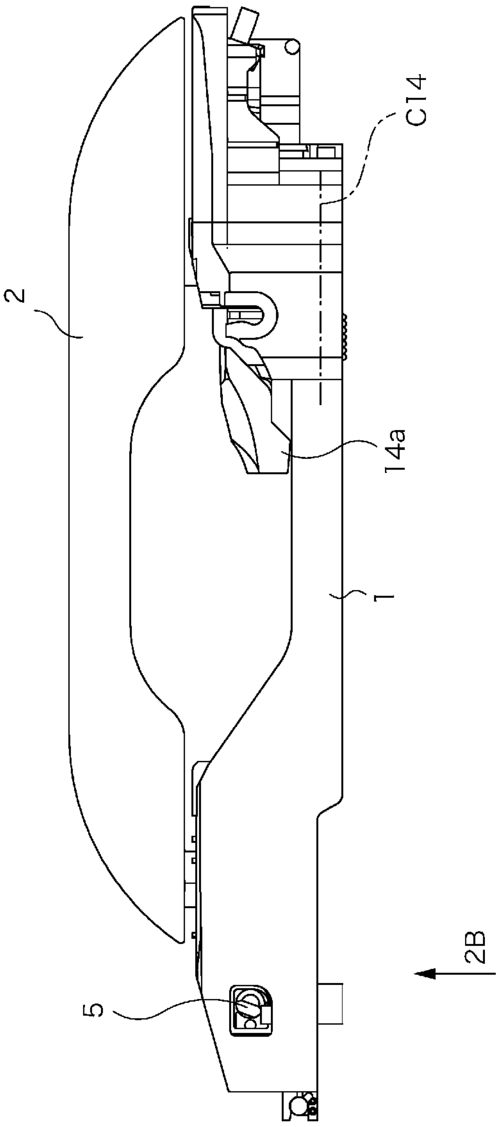
Figure 2B:
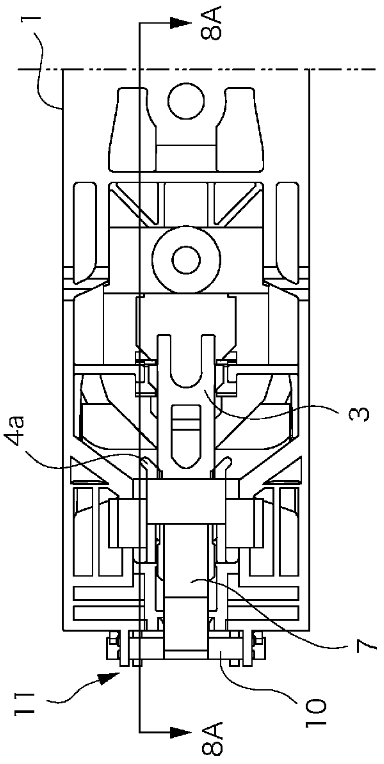

As shown in FIG. 1 and FIGS. 2A and 2B, a door handle device for a vehicle is formed by coupling an operation handle 2 to a handle base 1 in a rotatable way about a rotation center (C2). In order to prevent the handle base 1 from being exposed to an outside of a vehicle, the handle base 1 is fixed to a back surface of a door panel (not shown), and the operation handle 2 is coupled from the outside of the vehicle after the handle base 1 is attached to the vehicle.

In this embodiment, the operation handle 2 is disposed so as to cover an entire surface of the handle base 1, and when a cylinder lock 13 is provided on the handle base 1, a key operation opening 1*a* for exposing a key insertion opening 13*a* of the cylinder lock 13 to the outside is formed as shown by a chain line in FIG. 1.

Hereinafter, in the present specification, a rotation center (C2) side of the operation handle 2, that is, a left side in FIG. 1 is referred to as a "front side", an opposite direction thereof is referred to as a "rear side", an axial length direction of the rotation center (C2), that is, an upper-lower direction in FIG. 1 is referred to as "upper and lower", a pull-out direction of the operation handle 2, that is, a near side of a paper surface in FIG. 1 is referred to as a "front surface", and an opposite side is referred to as a "back surface". An operating lever 14 is coupled to a rear end portion of the handle base 1 so as to be rotatable about a rotation axis (C14), and rotation operation of the operating lever 14 is transmitted to a door lock device 16 for maintaining a door-closed state via a cable device 15 or the like to operate the door lock device 16. A counterweight 14*a* is fixed to the operating lever 14 to cancel out an inertial force when a side collision force is applied to the vehicle and prevent inadvertent opening of a door.

On the other hand, as shown in FIG. 3 and FIGS. 4A to 4C, the operation handle 2 has a coupling protruding portion 3 at a front end and an operating leg 2*a* at a rear end, a first arc surface 3*a* is formed at a front end of the coupling protruding portion 3, a second arc surface 3*b* concentric with the first arc surface 3*a* is formed on a surface-side wall surface thereof, and a stopper protruding portion 5 is formed at the center of the first and second arc surfaces 3*a*, 3*b*.

Figure 4A:
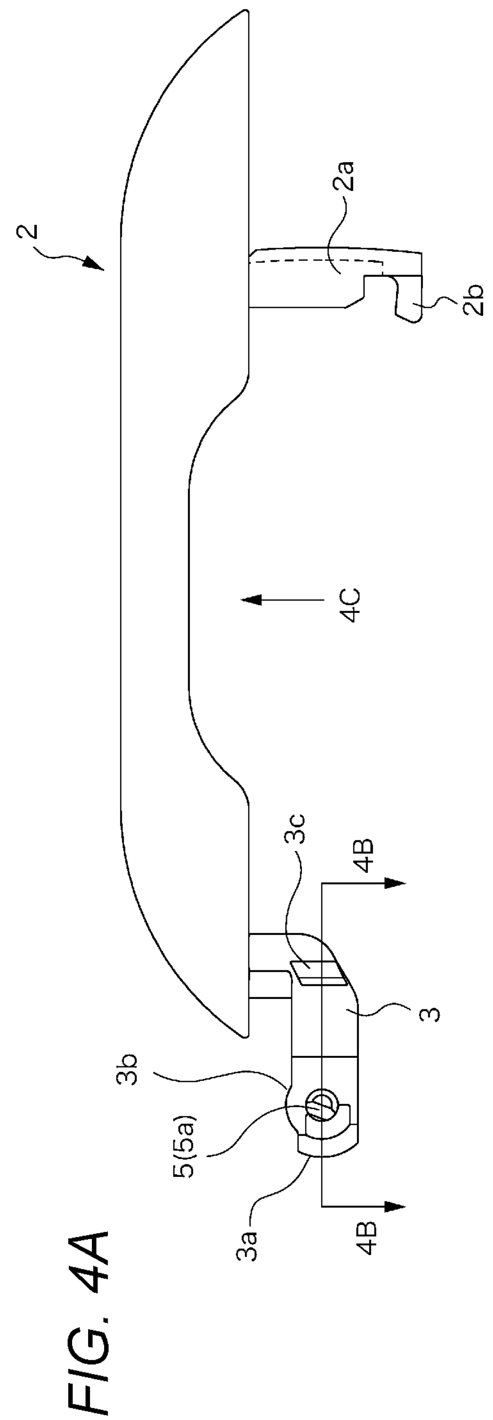
Figure 4B:
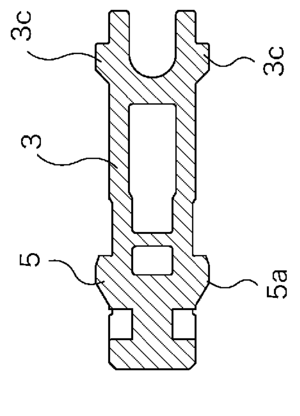
Figure 4C:
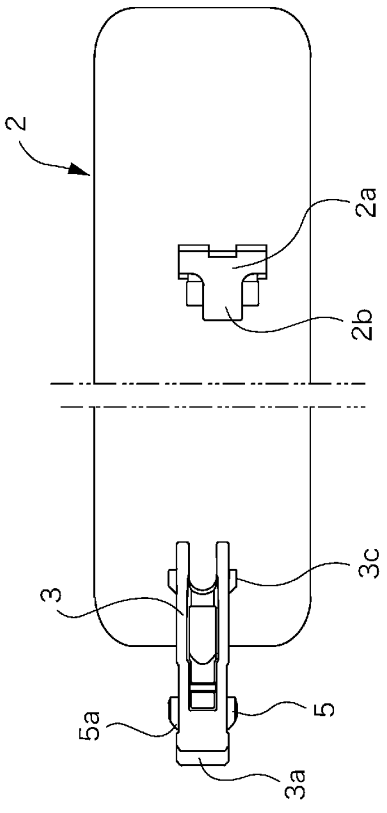

As shown in FIGS. 4A to 4C, a front half of the stopper protruding portion 5 is formed with inclined surfaces 5*a* whose protrusion dimension gradually increases toward a rear, and a rear end portion of the coupling protruding portion 3 is formed with handle-side restricting protruding portions 3*c*.

Figure 3:
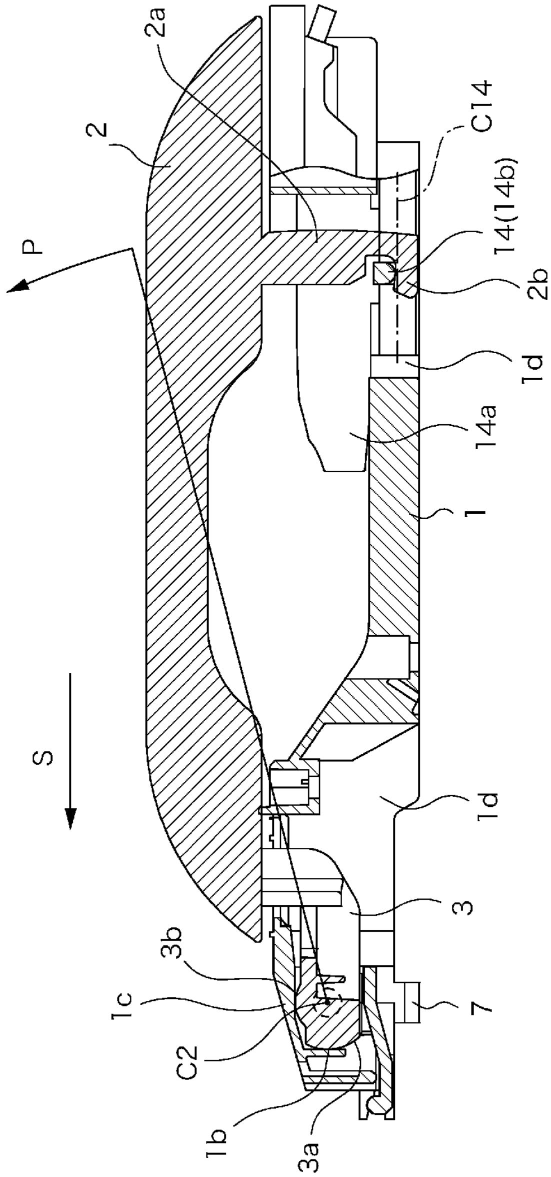
FIG. 3 is a cross-sectional view taken along a line 3A-3A in FIG. 1.

As shown in FIG. 3, in a state where the operation handle 2 is coupled to the handle base 1, the first circular arc surface 3*a* abuts on a front end abutting piece 1*b* formed on the handle base 1, and the second circular arc surface 3*b* abuts on a coupling protruding portion supporting wall 1*c* of the handle base 1. When the operation handle 2 is pulled out in the direction of an arrow (P) in FIG. 3 in this state, the operation handle 2 rotates about the center of the first and second arc surfaces 3*a*, 3*b* as the rotation center (C2) while the first and second arc surfaces 3*a*, 3*b* are in sliding contact with the corresponding wall surfaces 1*b*, 1*c*.

Further, as shown in FIGS. 1 and 3, a locking step portion 2*b* that protrudes forward from a free end of an operating leg 2*a* in a state where the operation handle 2 is coupled to the handle base 1 is locked to a locking rod 14*b* that protrudes from the operating lever 14, and the operating lever 14 rotates about the rotation axis (C14) in accordance with the rotation of the operation handle 2.

In the above description, the stopper protruding portion 5 is disposed on the rotation center (C2) of the operation handle 2, but the stopper protruding portion 5 may be disposed at a position deviated from the rotation center (C2). In this case, a clearance in a rotation direction is set between the stopper protruding portion 5 and a stopper fitting portion 6 to be described later to allow the rotation of the operation handle 2.

As shown in FIG. 3, the operation handle 2 is mounted to the handle base 1 by inserting the coupling protruding portion 3 and the operating leg 2*a* of the operation handle 2 into the door through a handle mounting opening 1*d* formed in front and rear portions of the handle base 1 and a handle mounting opening portion (not shown) of a door panel, and then sliding the entire operation handle 2 forward as indicated by an arrow (S) in FIG. 3.

In order to couple the operation handle 2, the handle base 1 is provided with the stopper fitting portion 6 into which the stopper protruding portion 5 of the operation handle 2 is fitted. As shown in FIGS. 5A to 5C and FIGS. 6A to 6C, the stopper fitting portion 6 is formed as an opening provided in a pair of elastic pieces 4 extending rearward in a cantilever shape from a front end portion of the handle base 1.

The pair of elastic pieces 4 are disposed at an interval slightly wider than an interval between upper and lower surfaces of the coupling protruding portion 3 of the operation handle 2 and narrower than an interval between tip ends of the stopper protruding portion 5, and guide inclined portions 4*a* whose interval between the elastic pieces 4 gradually increases toward the tip ends are formed at free end portions of the elastic pieces 4, respectively. Further, upper and lower wall surfaces of the handle base 1 are provided with an introduction opening 1*e* into which a slide core enters, the sliding core forming the stopper fitting portion 6 to be undercut at the time of molding by a mold in which a front surface and an opposite surface (back surface) direction thereof are set as a mold splitting direction.

Figure 6A:
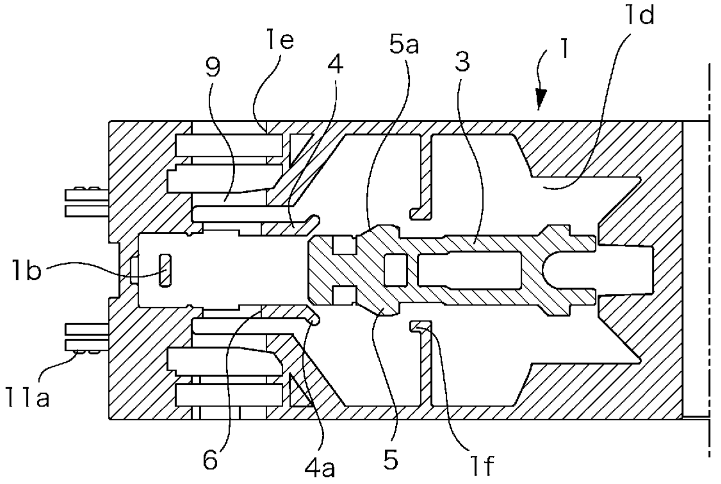
Figure 6B:
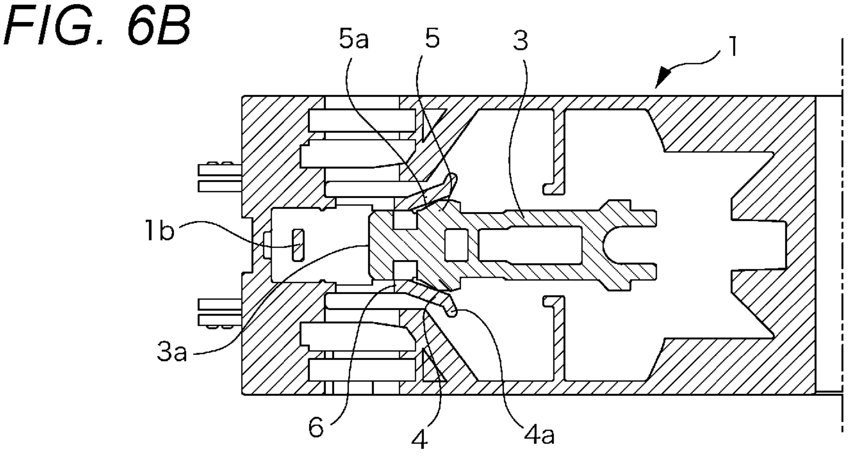

In the present embodiment configured as described above, as shown in FIG. 6A, in a state where the coupling protruding portion 3 of the operation handle 2 is set in the handle mounting opening 1*d*, the guide inclined portions 4*a* of the elastic pieces 4 are positioned on a movement path of the stopper protruding portion 5 of the operation handle 2. When the operation handle 2 is slid forward from this state, the inclined surface 5*a* of the stopper protruding portion 5 comes into contact with the guide inclined portion 4*a*, and when the operation handle 2 is further slid, as shown in FIG. 6B, the facing elastic pieces 4 are elastically deformed so as to retreat by the stopper protruding portion 5 to allow passage of the stopper protruding portion 5. The stopper protruding portion 5 is elastically restored at a position corresponding to the stopper fitting portion 6, and as shown in FIG. 6C, the stopper fitting portion 6 is elastically engaged with the stopper protruding portion 5.

As shown in FIG. 3, the front end abutting piece 1*b* formed on the handle base 1 is formed in a cantilever shape protruding from a front surface side to a back surface side and is formed to be elastically deformable. In a state where the stopper protruding portion 5 of the operation handle 2 is fitted into the stopper fitting portion 6 of the handle base 1, the front end abutting piece 1*b* is slightly bent forward, and the operation handle 2 is pressed backward by an elastic restoring force of the front end abutting piece 1*b*, and the stopper protruding portion is brought into press-contact with a rear end edge of the stopper fitting portion 6, thereby preventing the operation handle 2 from rattling.

Further, a torque around the rotation axis (C14) is applied to the operating lever 14 by a torsion spring (not shown), and the locking rod 14*b* is pressed to the back surface side in FIG. 3. As a result, the operation handle 2 is biased toward an initial rotational position side shown in FIG. 3, thereby preventing rattling.

Figure 6C:
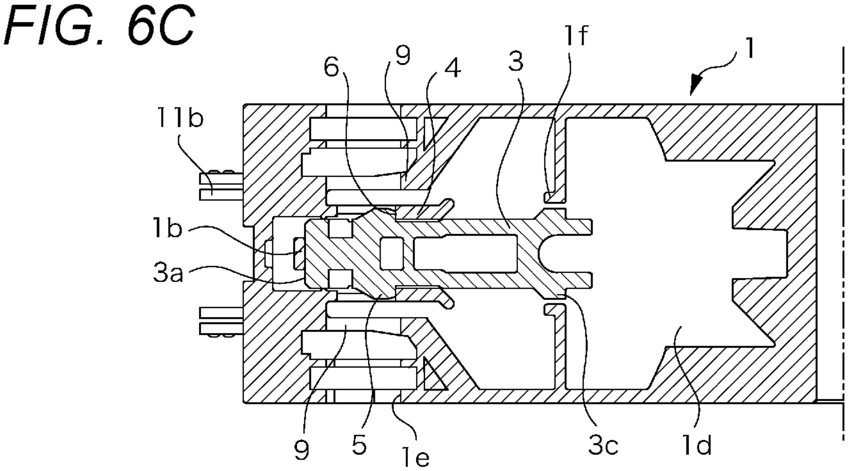

In this state, as shown in FIG. 6C, when a rearward pulling operation force is applied to the operation handle 2, a rearward force is applied to the stopper fitting portion 6. As a result, only a tensile force acts on the elastic pieces 4 extending rearward with the front side as a base end via the stopper fitting portion 6, and a force of compression and bending is not added, so that high fracture and deformation resistance can be expected.

Further, as shown in FIG. 6C, the handle base 1 is provided with base side restricting protruding portions 1*f* so as to face the handle-side restricting protruding portions 3*c* of the operation handle 2 in a state where the operation handle 2 is coupled to the handle base 1, thereby restricting swinging of the operation handle 2 in the upper-lower direction.

Figure 7A:
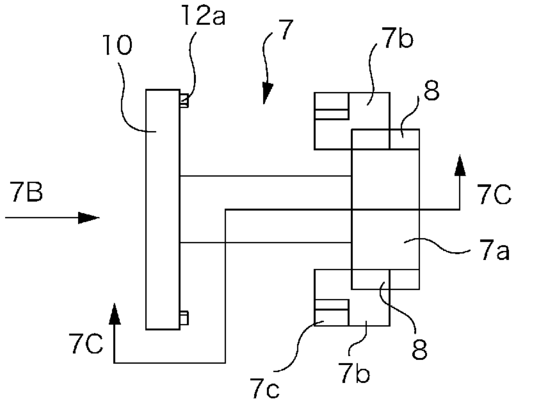
Figure 7B:
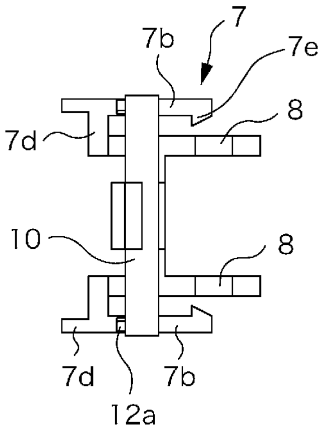
Figure 7C:
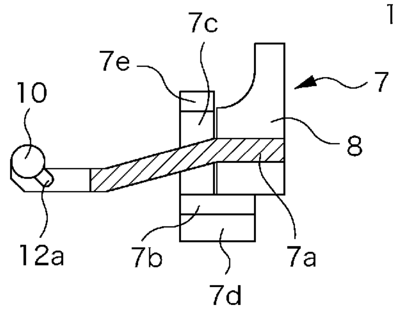

A clip 7 is mounted on the above handle base 1. As shown in FIGS. 7A to 7C, the clip 7 is provided with a columnar coupling shaft portion 10 elongated in the upper-lower direction and formed at one end thereof, a pair of restraining pieces 8, 8 disposed behind the coupling shaft portion 10 and coupled to each other by a coupling piece 7*a*, leg portion support pieces 7*b* extending from one ends of the respective restraining pieces 8, 8 and in parallel to the coupling piece 7*a*, and base locking legs 7*c* erected on the respective leg portion supporting pieces 7*b*. An operation piece 7*d* for operating the clip 7 is provided on an opposite surface of the leg portion support piece 7*b* on which the base locking leg 7*c* is erected.

Figure 5A:
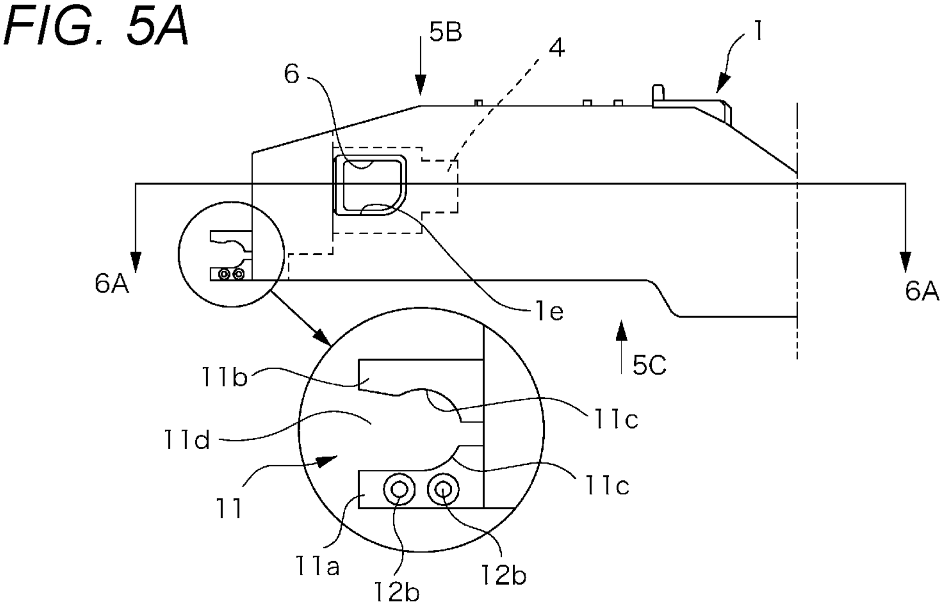
Figure 5B:
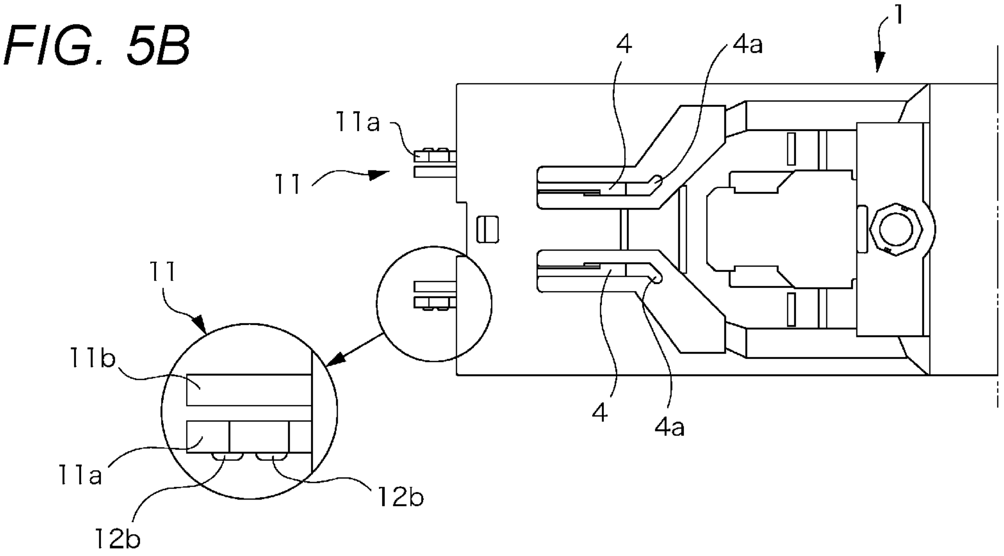
Figure 5C:
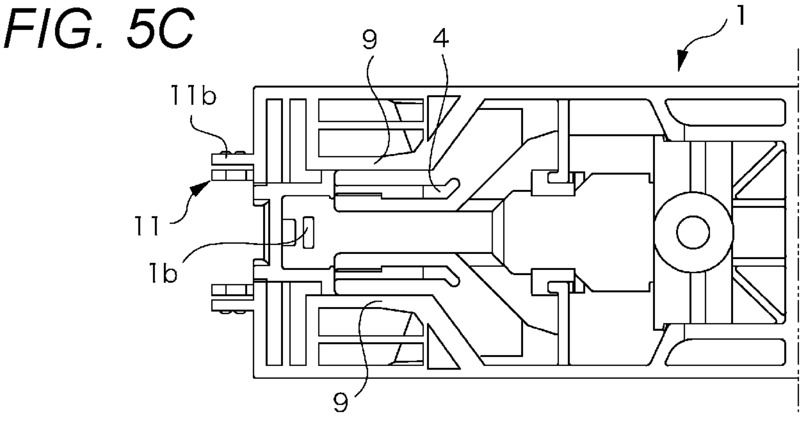

Two sets of shaft holding portions 11 are formed at a predetermined interval in the handle base 1 in order to hold upper and lower end portions of the coupling shaft portion 10. As shown in FIGS. 5A to 5C, each of the shaft holding portions 11 includes a back-surface-side support piece 11*a* that protrudes from the front end of the handle base 1 and supports the coupling shaft portion 10 from a back surface direction, and a front-surface-side support piece 11*b* that supports the coupling shaft portion 10 from the front surface side, and the back-surface-side support piece 11*a* and the front-surface-side support piece 11*b* are disposed at positions slightly shifted in the upper-lower direction.

As shown in FIG. 5A, on the front surface of the back-surface-side support piece 11*a* and the rear surface of the front-surface-side support piece 11*b*, shaft portion support surfaces 11*c* having substantially the same curvature as that of the coupling shaft portion 10 are formed, each shaft portion support surface 11*c* extends forward, and extension portion cooperate with the shaft portion support surfaces 11*c* to form a shaft introduction portion 11*d* that is open forward in a front view. An upper-lower interval of the shaft introduction portion 11*d* is set to be slightly narrow at an open tip end so that the coupling shaft portion 10 can pass therethrough.

The mounting of the clip 7 on the handle base 1 is performed by pushing both ends of the coupling shaft portion 10 into the shaft holding portion 11, and when the coupling shaft portion 10 is pressed against the shaft introduction portion 11*d* of the shaft holding portion 11, the front and back side support pieces 11*a*, 11*b* are elastically deformed to receive the coupling shaft portion 10, and in this state, the coupling shaft portion 10 is supported by the shaft portion support surfaces 11*c*. In a state where the coupling shaft portion 10 is coupled to the handle base 1, the clip 7 is rotatable about the coupling shaft portion 10 and is temporarily held without being detached from the handle base 1.

Figure 8A:
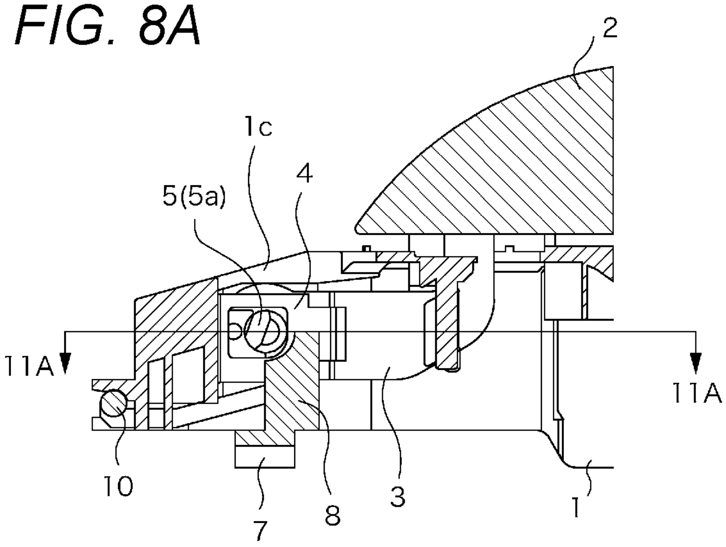
Figure 8B:
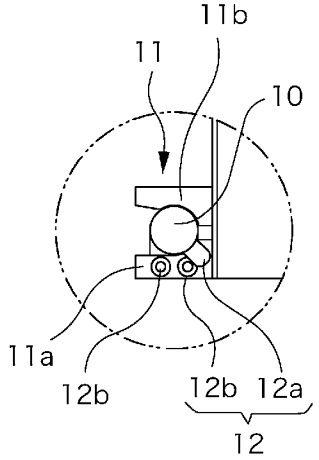

The coupling shaft portion 10 of the clip 7 and the shaft holding portions 11 of the handle base 1 are provided with a detent stop portion 12 such that the clip 7 temporarily held by the handle base 1 does not rotate inadvertently. As shown in FIGS. 8A and 8B, the detent stop portion 12 includes detent stop protruding portions 12*a* formed at both ends of the coupling shaft portion 10 and detent stop bosses 12*b* formed on the shaft holding portion 11 and protruding on a movement path of the detent stop protruding portion 12*a* when the clip 7 rotates. Two detent stop bosses 12*b* are formed at an interval substantially equal to a dimension of the detent stop protruding portion 12*a* in a width direction so that the detent stop protruding portion 12*a* can be sandwiched therebetween.

When the clip 7 rotates in a direction of FIG. 9A at a restraint release position where the movement of the elastic pieces 4 by the restraining pieces 8 is not restrained as described later, the detent stop protruding portion 12*a* abuts on one detent stop boss 12*b*, and when the clip 7 further rotates, the shaft holding portion 11 is elastically deformed to allow the detent stopping protruding portion 12*a* to pass between the detent stop bosses 12*b*. Thereafter, the detent stop protruding portion 12*a* moves between the detent stop bosses 12*b* while giving detent sensation as shown in FIG. 9B. At this position, the detent stop protruding portion 12*a* is held at the rotation position since movement thereof to both left and right is restricted by the detent stop bosses 12*b*.

Figure 9A:
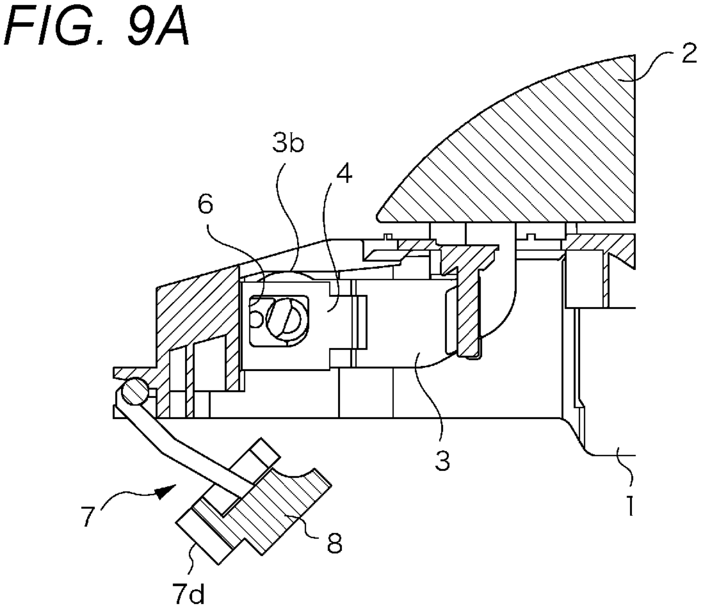
Figure 9B:
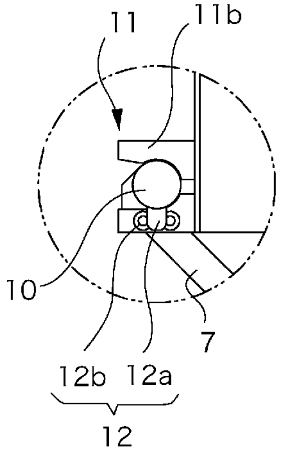
Figure 10:
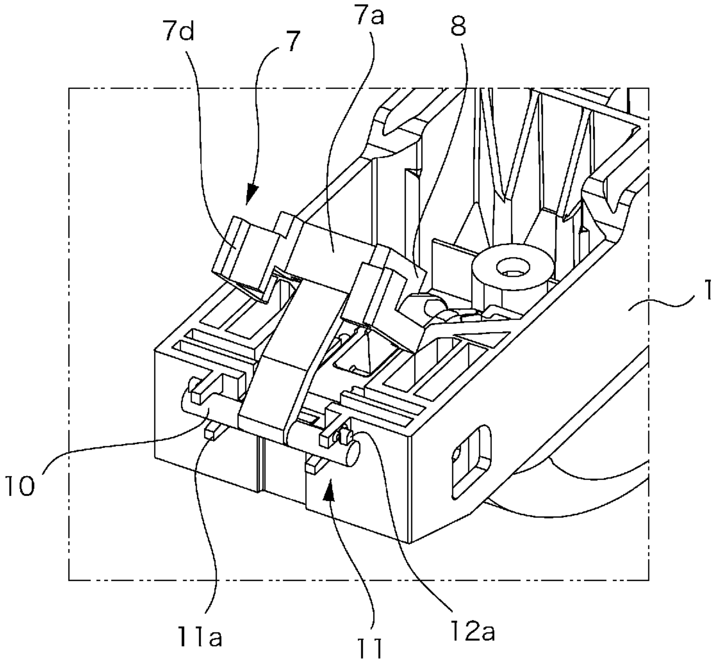
FIG. 10 is a perspective view showing a state where the clip is held at the restraint release position at a predetermined angle.

When the operation piece 7*d* is pushed from this state and rotates counterclockwise in FIG. 9A, the restraining piece 8 of the clip 7 enters the handle base 1 and moves to a restraint position shown in FIGS. 8A and 8B. As shown in FIGS. 6A to 6C and FIG. 10, the handle base 1 is provided with clip-restricting walls 9 so as to face the elastic pieces 4, and the restraining piece 8 of the clip 7 enters a space formed between the elastic piece 4 and the clip-restricting wall 9.

Figure 11A:
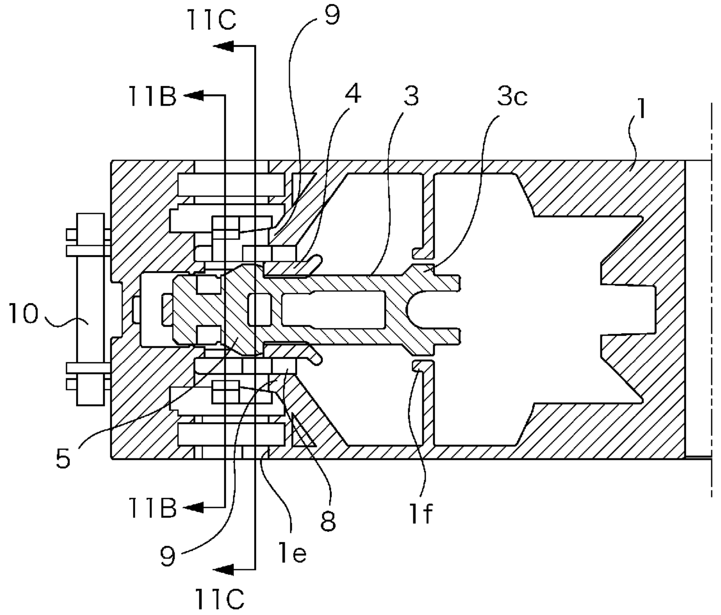
Figure 11B:
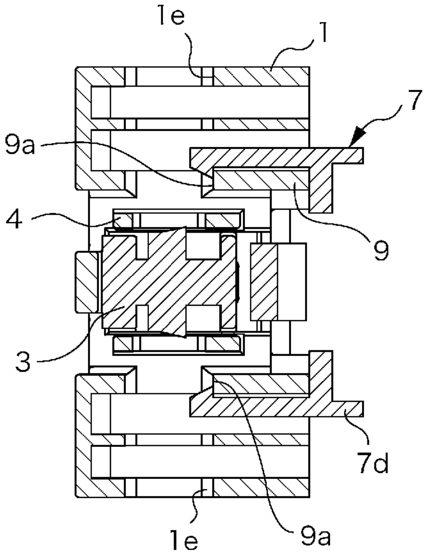

As shown in FIG. 11A, the clip-restricting wall 9 of the handle base 1 is formed with a clip-locking step portion 9*a* using the above-described introduction opening 1*e*, and when the clip 7 rotates, as shown in FIG. 11B, a locking hook 7*e* formed on the base locking leg 7*c* of the clip 7 is locked to the clip locking step portion 9*a* and held at the restraint position.

Figure 11C:
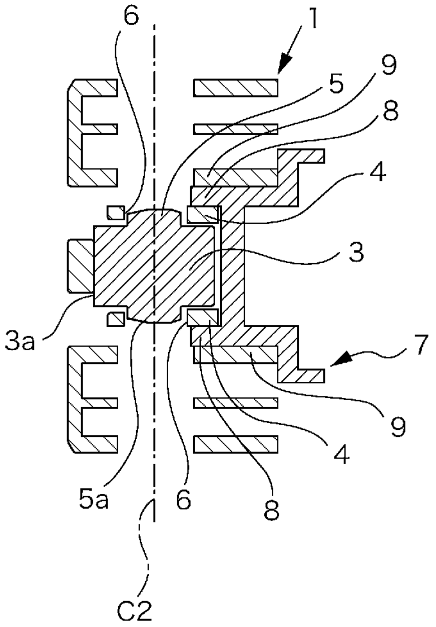

As shown in FIG. 11C, at the restraint position, the restraining piece 8 of the clip 7 sandwiches the elastic piece 4 from above and below together with the coupling protruding portion 3 of the operation handle 2, and restricts the movement of the elastic piece 4 in the upper-lower direction, that is, in the direction in which the stopper fitting portion 6 is detached from the stopper protruding portion 5. In this state, the movement of the restraining piece 8 in the upper-lower direction is restricted by the clip-restricting wall 9 of the handle base 1, and the elastic piece 4 does not move even when a large force in the upper-lower direction is applied.

Further, the locking of the locking leg 7*c* is released by the clockwise rotation of the clip 7 that is at the restraint position in FIG. 8A by operating the operation piece 7*d*, so that the clip 7 can be easily moved to the restraint release position shown in FIGS. 9A and 9B.

Figure 12A:
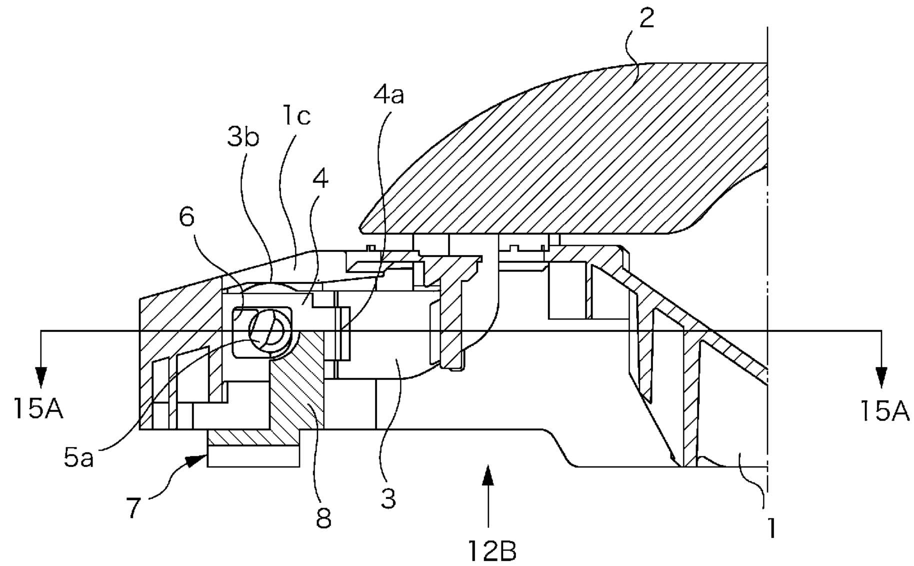
Figure 12B:
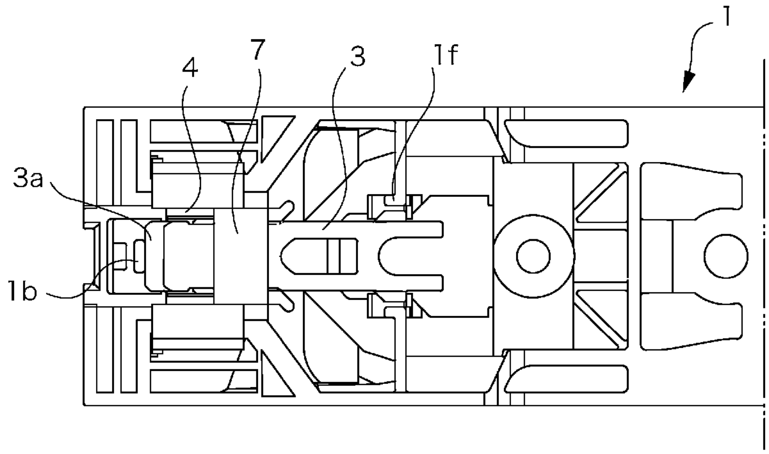

FIGS. 12A and 12B and the following show another embodiment of the present disclosure. In the description of the present embodiment, components that are substantially the same as those of the above-described embodiment are denoted by same reference numerals in the drawings, and description thereof will be omitted.

Figure 13A:
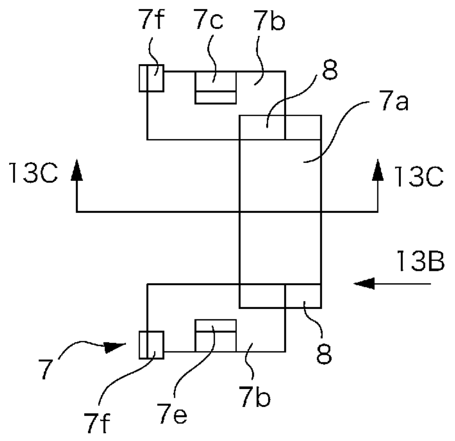
Figure 13B:
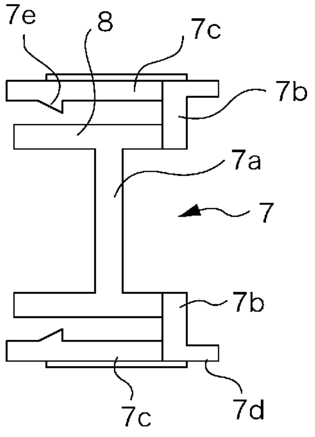
Figure 13C:
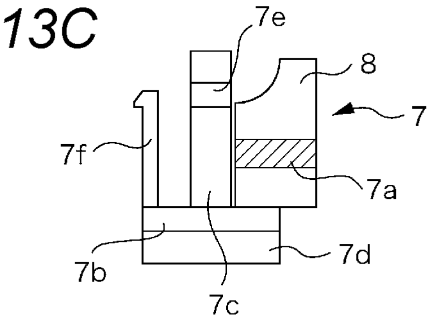
Figure 14:
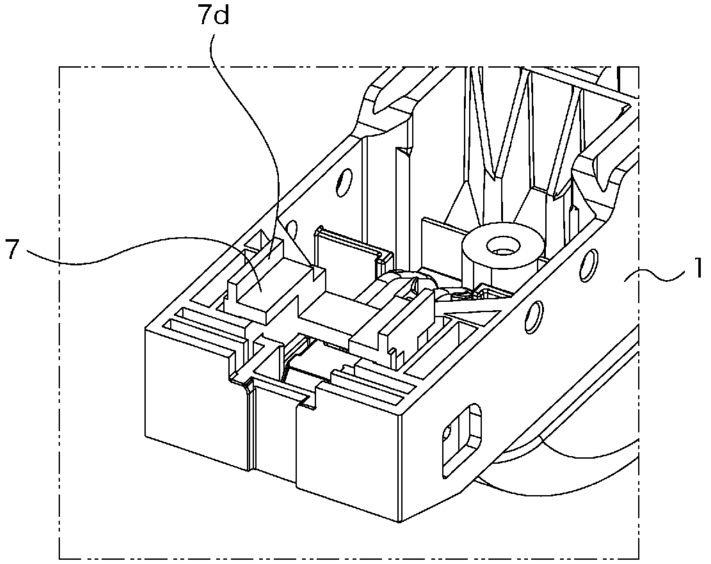
FIG. 14 is an enlarged perspective view of a main portion showing a state where the clip is mounted, as viewed from a back surface direction.

As shown in FIGS. 13A to 13C, in the present embodiment, the clip 7 includes the pair of restraining pieces 8, 8 coupled by the coupling piece 7*a*, the leg portion supporting pieces 7*b* extending from one ends of the respective restraining pieces 8, 8 and in parallel to the coupling piece 7*a*, the base locking legs 7*c* erected on the respective leg portion support pieces 7*b*, and temporary holding locking legs 7*f* erected from the respective front end edges of the leg portion support pieces 7*b*. A locking hook 7*e* is provided on the base locking leg 7*c*. FIG. 14 is an enlarged perspective view of a main portion showing a state where the clip 7 is mounted, as viewed from the back surface direction.

Figure 16A:
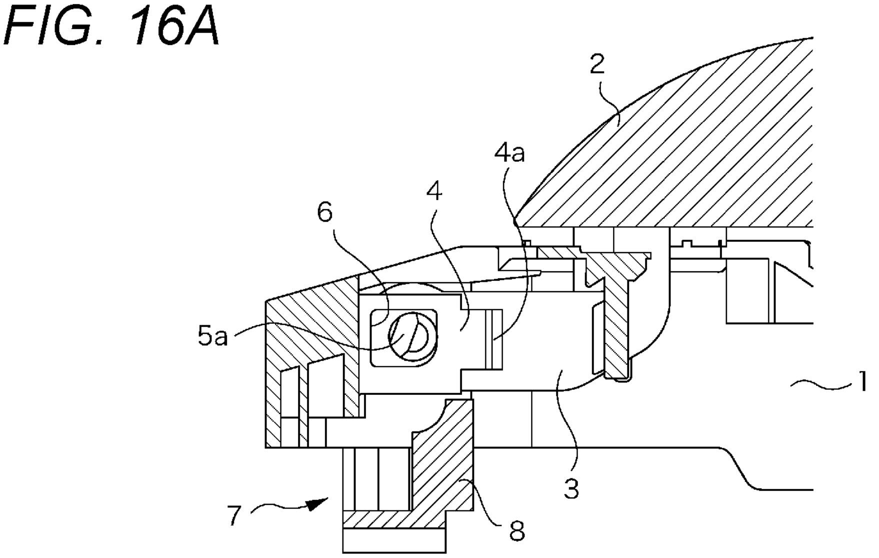
Figure 16B:
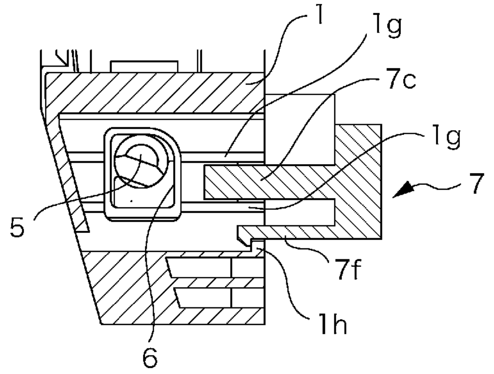
Figure 16C:
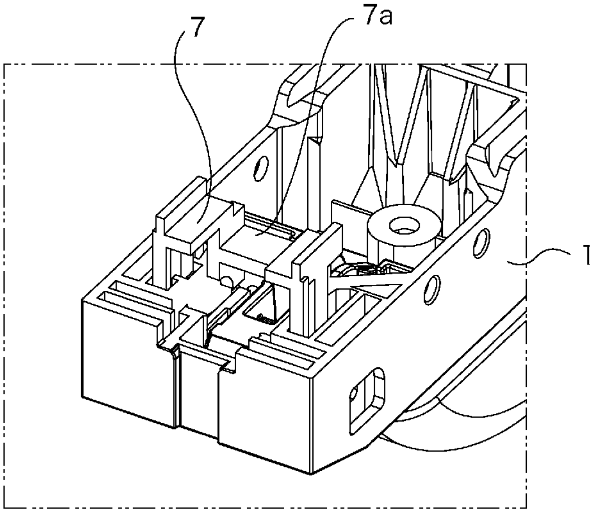

The coupling of the clip 7 to the handle base 1 is performed by pushing the clip 7 from the back surface side of the handle base 1 toward the direction of the front surface as shown in FIG. 16C. As shown in FIG. 16B, in order to restrict the insertion direction of the clip 7, the handle base 1 is provided with two guide protrusions 1*g*, 1*g* for guiding front and rear side wall surfaces of the base locking leg 7*c* of the clip 7.

Further, the handle base 1 is formed with a clip temporary holding step portion 1*h*, and as shown in FIG. 16B, when the temporary holding locking leg 7*f* is elastically locked to the clip temporary holding step portion 1*h* to be held at the restraint release position, loss of the clip 7 can be prevented.

Figure 15A:
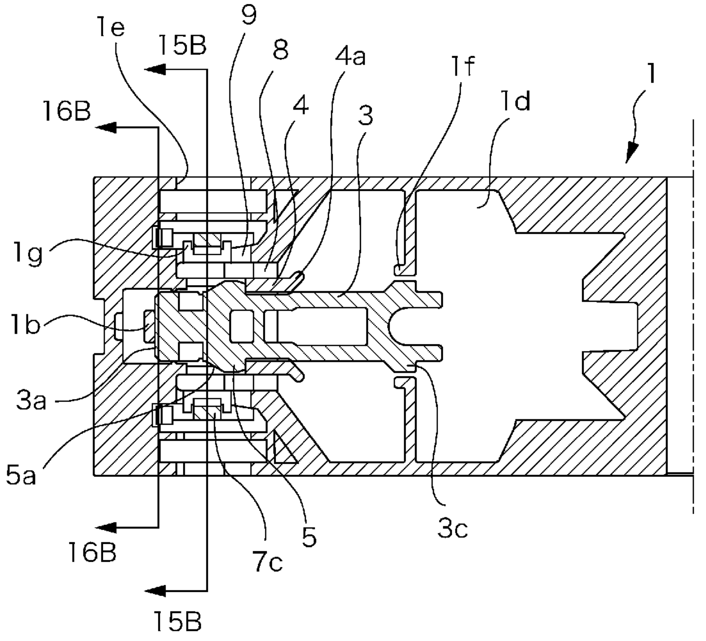
Figure 15B:
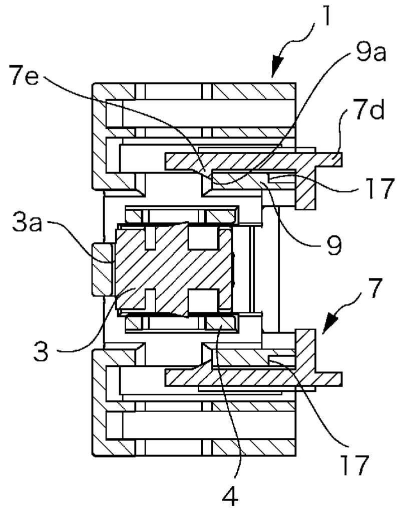
Figure 15C:
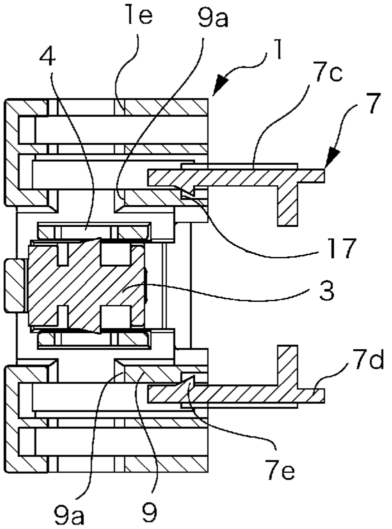

Further, as shown in FIG. 15C, the handle base 1 is formed with restricting step portions 17 for restricting the movement of the base locking legs 7*c* to the surface side of the locking hook 7*e* when the clip 7 is at the restraint release position, and the clip 7 is restricted from being inadvertently moved from the restraint released state to the restraint position.

When the operation piece 7*d* is pushed from the restraint release position, the base locking leg 7*c* is elastically deformed and the locking hook 7*e* climbs over the restriction step portion 17, thereafter, the locking hook 7*e* is elastically locked to the clip locking step portion 9*a* of the handle base 1 similarly to the above-described embodiment, and thereafter, the clip 7 is held at the restraint position where the movement of the elastic piece 4 is restricted.

Further, the locking of the locking leg 7*c* is released by operating the operation piece 7*d* to pull the clip 7 at the restraint position to the back surface side, so that the clip 7 can be easily moved to the restraint release position shown in FIG. 16A.

As described above, the door handle device for a vehicle according to the present disclosure is configured as follows.

The door handle device for a vehicle includes: the handle base 1 fixed to a door of a vehicle; and the operation handle 2 rotatably coupled to the handle base 1. The movement of the operation handle 2 toward a rotation tip end is restricted by elastically engaging the stopper protruding portion 5 formed on any one of a coupling protruding portion 3 that is provided at an end portion on the rotation center (C2) side of the operation handle 2 and the elastically deformable elastic pieces 4 that are adjacent to the coupling protruding portion 3 in the handle base 1 with the stopper fitting portion 6 formed on the other by using elastic deformation of the elastic pieces 4, and the movement of the elastic pieces 4 in a disengagement direction of the stopper protruding portion 5 is restricted by the clip 7 mounted on the handle base 1.

In the present disclosure, the handle base 1 is provided with the elastically deformable elastic pieces 4 adjacent to the coupling protruding portion 3 of the operation handle 2, and one of the coupling protruding portion 3 and the elastic pieces 4 is provided with the stopper protruding portion 5, and the other is provided with the stopper fitting portion 6 with which the stopper protruding portion 5 is engaged.

The movement of the operation handle 2 toward the rotation tip end (the opposite end to the rotation center (C2)) side is restricted by fitting the stopper protruding portion 5 into the stopper fitting portion 6. Fitting of the stopper protruding portion 5 into the stopper fitting portion 6 is performed by once elastically deforming the elastic pieces 4 to move the operation handle 2 to the coupling position and then elastically restoring the elastic pieces 4.

Coupling of the operation handle 2 can be performed by sliding the operation handle 2 on the rotation center (C2) side to the coupling position, and in this case, after the stopper protruding portion 5 interferes with a member in which the stopper fitting portion 6 is formed in accordance with the sliding of the operation handle 2 and the elastic pieces 4 are elastically deformed, the elastic pieces 4 return to the original position at a portion where the stopper protruding portion 5 and the stopper fitting portion 6 coincide with each other, and the stopper protruding portion 5 falls into the stopper fitting portion 6 and is elastically fitted.

The clip 7 is mounted in a state where the stopper protruding portion 5 is fitted into the stopper fitting portion 6, and restricts the movement of the elastic pieces 4 in a fitting and detaching direction of the stopper protruding portion 5 and the stopper fitting portion 6, that is, in an elastic deformation direction during the coupling of the operation handle 2, so that the elastic pieces 4 are prevented from being elastically deformed in a lock release direction of the stopper protruding portion 5 inadvertently to prevent the operation handle 2 from being detached from the handle base 1.

The stopper protruding portion 5 can be formed on either the elastic pieces 4 or the coupling protruding portion 3 of a handle body, but when the stopper protruding portion 5 is formed on a handle body side, it is possible to increase a strength when a load of the operation handle 2 applied to the rotation tip end side. That is, in the case where the stopper protruding portion 5 is provided on the elastic pieces 4 which is generally formed thin in order to impart elasticity as in the related-art example described above, there is a possibility that the elastic pieces 4 are torn off from a base end portion of the stopper protruding portion 5 due to a load of the operation handle 2 applied to the rotation tip end side, and when the stopper protruding portion 5 protrudes from the coupling protruding portion 3 that can be expected to have sufficient strength, resistance to the above-described breaking mode is improved.

The clip 7 can be press-fitted and mounted in an appropriate press-fitting space formed in the handle body, for example, but when the clip 7 is configured to be elastically locked to the handle base 1 so as to be maintained in the mounted state, it is possible to enhance mounting operability and prevent inadvertent detachment.

Further, when the handle device for a vehicle is configured in which the clip 7 includes the restraining piece 8 for restraining the movement of the elastic pieces 4 in the mounted state, and the handle base 1 is provided with the clip-restricting walls 9 for sandwiching the restraining piece 8 of the clip 7 in cooperation with the coupling protruding portion 3, the movement of the elastic pieces 4 can be restricted without excessively increasing the rigidity of the restraining piece 8 of the clip 7.

Further, when the handle device for a vehicle is configured in which the clip 7 is movable between the restraint position for restraining the movement of the elastic pieces 4 and the restraint release position, and is temporarily held at the restraint release position, it is possible to couple the clip 7 until the handle device for a vehicle is assembled to the vehicle, so that it is possible to prevent inadvertent dissipation of parts.

In this case, the handle device for a vehicle can be configured in which the clip 7 is rotatably coupled to the handle base 1 between the restraint release position and the restraint position at the coupling shaft portion 10.

When the handle device for a vehicle is configured in which the handle base 1 is provided with the shaft holding portion 11 configured to rotatably hold the coupling shaft portion 10 of the clip 7, and the shaft holding portion 11 and the coupling shaft portion 10 are provided with a detent stop portion 12 that detent-stops the clip 7 at the restraint release position at a predetermined angle. Since the clip 7 at the restraint release position can be restricted to the predetermined angle, it is possible to prevent a fault in which the clip 7 becomes an obstacle when the handle device is attached to the door.

Although various embodiments have been described above with reference to the drawings, it is needless to say that the present disclosure is not limited to such embodiments. It is apparent to those skilled in the art that various variations or modifications can be conceived within the scope described in the claims, and it is understood that the variations or modifications naturally fall within the technical scope of the present disclosure. Further, the components described in the above embodiments may be freely combined without departing from the spirit of the disclosure.

What is claimed is:

1. A door handle device for a vehicle comprising:

a handle base fixed to a door of a vehicle; and an operation handle rotatably coupled to the handle base, wherein the operation handle includes a coupling protruding portion that is provided at an end portion on a rotation center side of the operation handle, wherein the handle base includes an elastically deformable elastic piece that is adjacent to the coupling protruding portion, wherein movement of the operation handle toward a rotation tip end is restricted by elastically engaging a stopper protruding portion formed on any one of the coupling protruding portion and the elastic piece with a stopper fitting portion formed on the other by using elastic deformation of the elastic piece, and wherein movement of the elastic piece in a disengagement direction of the stopper protruding portion is restricted by a clip mounted on the handle base.

2. The door handle device for a vehicle according to claim 1, wherein the clip is elastically locked to the handle base and maintained in a mounted state.

3. The door handle device for a vehicle according to claim 1, wherein the clip includes a restraining piece configured to restrain movement of the elastic piece in a mounted state, and wherein the handle base is provided with clip-restricting walls configured to sandwich the restraining piece of the clip in cooperation with the coupling protruding portion.

4. The door handle device for a vehicle according to claim 1, wherein the clip is movable between a restraint position configured to restrain the movement of the elastic piece and a restraint release position, and is temporarily held at the restraint release position.

5. The door handle device for a vehicle according to claim 4, wherein the clip is rotatably coupled to the handle base between the restraint release position and the restraint position at a coupling shaft portion.

6. The door handle device for a vehicle according to claim 5, wherein the handle base is provided with a shaft holding portion configured to rotatably hold the coupling shaft portion of the clip, and wherein the shaft holding portion and the coupling shaft portion are provided with a detent stop portion configured to detent-stop the clip at the restraint release position at a predetermined angle.

* * * * *